(12) United States Patent
Dion

(10) Patent No.: US 7,917,417 B2
(45) Date of Patent: Mar. 29, 2011

(54) SYSTEM AND METHOD FOR ORGANIZATIONAL AND PERSONAL PORTFOLIO

(76) Inventor: Kenneth W. Dion, Austin, TX (US)

( * ) Notice: Subject to any disclaimer, the term of this patent is extended or adjusted under 35 U.S.C. 154(b) by 329 days.

(21) Appl. No.: 11/542,839

(22) Filed: Oct. 4, 2006

(65) Prior Publication Data

US 2007/0094121 A1 Apr. 26, 2007

(51) Int. Cl.
*G06Q 40/00* (2006.01)
(52) U.S. Cl. .......... 705/36 R; 705/40; 434/118; 235/380
(58) Field of Classification Search ............. 705/35, 705/36 R, 40; 434/118, 350; 235/380; 715/206
See application file for complete search history.

(56) References Cited

U.S. PATENT DOCUMENTS

| | | | |
|---|---|---|---|
| 4,832,372 A | 5/1989 | Young | |
| 5,059,052 A | 10/1991 | Casper | |
| 5,961,150 A | 10/1999 | Kogutt et al. | |
| 6,092,081 A | 7/2000 | Alpert et al. | |
| 6,175,922 B1 | 1/2001 | Wang | |
| 6,216,001 B1 | 4/2001 | Ghirnikar et al. | |
| 6,240,444 B1 | 5/2001 | Fin et al. | |
| 6,263,209 B1 | 7/2001 | Reed et al. | |
| 6,266,539 B1 | 7/2001 | Pardo | |
| 6,269,948 B1 | 8/2001 | Jackson | |
| 6,278,981 B1 | 8/2001 | Dembo et al. | |
| 6,282,433 B1 | 8/2001 | Holshouser | |
| 6,356,961 B1 | 3/2002 | Oprescu-Sircobe | |
| 6,396,481 B1 | 5/2002 | Challa et al. | |
| 6,405,226 B1 * | 6/2002 | Alpert et al. | 715/206 |
| 6,484,152 B1 | 11/2002 | Robinson | |
| 6,496,681 B1 * | 12/2002 | Linton | 434/350 |
| 6,571,086 B1 | 5/2003 | Uusimaki | |
| 6,691,233 B1 | 2/2004 | Gannage et al. | |
| 6,932,268 B1 * | 8/2005 | McCoy et al. | 235/380 |
| 7,333,951 B1 * | 2/2008 | Corning et al. | 705/36 R |
| 2003/0190590 A1 * | 10/2003 | Lumsden et al. | 434/118 |
| 2003/0191777 A1 * | 10/2003 | Lumsden et al. | 707/104.1 |
| 2005/0192901 A1 * | 9/2005 | McCoy et al. | 705/40 |

FOREIGN PATENT DOCUMENTS

WO WO2007081519 * 7/2007

OTHER PUBLICATIONS

Tyler, Kathryn. Employees can Help Recruit New Talent. HR Magazine. © Sep. 1996.*

* cited by examiner

*Primary Examiner* — Thu-Thao Havan
*Assistant Examiner* — Robert R Niquette
(74) *Attorney, Agent, or Firm* — Meyertons, Hood, Kivlin, Kowert & Goetzel, P.C.; Eric B. Meyertons

(57) ABSTRACT

An intelligent and automated system and method for establishment, collection, and maintaining of organizational and personal portfolios. In relationship to the present invention the term intelligent refers to the systems program structure which facilitates simple user entry while performing complex operations and manipulations, transparent to the individual. The term automated relates to the structured computer algorithms implementing the present system. Additionally, users may customize interfaces and functions to improve their interactions with the present invention. Also multiple selected copies may be collected into repositories as the user desires. The present system functionality is offered as a complete package with hardware and software available through any internet connection. The combination of native code with design patterns to isolate repeated elements improves reliability and stability of system operation.

47 Claims, 12 Drawing Sheets

Navigation: Education List > Education Update

210

611

Required fields are highlighted and flagged with an asterisk (*) 610 612 614
Update Education

| | Update | Cancel |

| School Name: 616 618 622 620 | UT Austin - School of Business * |
| School City: | Austin * |
| State: | Texas ▼ |
| Degree Level: | Master ▼ |
| Details if 'Other': | |
| Degree Awarded: | MBA |
| Year Awarded: | 1995 |
| Major(s): | Business |
| GPA: | 3.50 |
| Class Rank: | |
| Credits/Semester: | |
| Credits/Quarter: | |

623

| | Update | Cancel |

Navigation: Education List
⎯⎯ 611
Education List ⎯⎯⎯⎯⎯⎯⎯⎯ 751  210

On this page you can access details about the education entries that you can select for inclusion in a portfolio. You can add a new education entry by clicking the colored message just below these instructions.

(Edit Instructions)
(Edit Help)
(Help)

Click here to add a new education ⎯⎯⎯ 755  757  759    761  753

| School Name | Year Awarded | Actions |
|---|---|---|
| University of Central Florida | 1991 | View  Update  Delete  Audit  Documents  Photos |
| UT Austin - School of Business | 1995 | View  Update  Delete  Audit  Documents  Photos |
| UT Austin - School of Nursing | 1995 | View  Update  Delete  Audit  Documents  Photos |

| My Tasks | | |
|---|---|---|
| Task | Date Due | % Complete |
| RN 2 - CEU Credits | 10/16/2006 | 50% |
| RN 2 - Experience | 10/16/2006 | 100% |
| RN 2 - Leadership | 10/16/2006 | % |
| RN 2 - Mentoring | 10/16/2006 | 0% |
| RN 2 - Quality Team | 10/16/2006 | 100% |

View Your Tasks ⎯⎯⎯ 773

Fig 7b

Navigation: Portfolio List > Portfolio View
— 611

210
777  779    781    783  785

(Edit Instructions)

| View Portfolio | | Back |
|---|---|---|
| Portfolio Name: | Academic | |
| Portfolio Description: | | |
| Cover Text: | My Goals of 2006 | |
| Committees: | Executive Committee | |
| Consulting Activities: | Information technology consultant | |
| Documents: | Ecosys<br>NS<br>Portfolio Features<br>Resume KD | |
| Education: | University of Central Florida<br>UT Austin - School of Business<br>UT Austin - School of Nursing | |
| Fellowships: | | |
| Honors: | | |
| Licenses: | Registered Nurse (RN) | |
| Memberships: | American Nurses Association<br>Texas Nurses' Association | |
| Military Service: | | |
| Other Activities: | | |
| Photos: | License | |
| Presentations: | | |
| Professional Certifications: | Pedatric Advanced Life Support (PALS) | |
| Publications: | The Professional Portfolio<br>UT | |
| Research Activities: | | |
| Student Activities: | | |
| Teaching Activities: | | |
| Technical Certifications: | | |
| Training/Seminars: | | |
| Work History: | Founder and Chief Executive Officer | |

| | Back |
|---|---|

| View Requirements | Back |
|---|---|

Requirements Name: Career Advancement to RN2
Requirements Description: Advancing to a Level 2 RN requires that you prepare a profile that demonstrates your mastery of the items listed. — 853
Requirements Instructions: — 855
Requirements Author: — 857
Requirements Version: 1.1 — 859
Released?: No — 861

| Sequence | Item Text | Caption? | Active? |
|---|---|---|---|
| 1 | Leadership in your current department | No | Yes |
| 2 | Mentoring of less experienced nurses | No | Yes |
| 3 | Participation as a member of (More ...) | No | Yes |
| 4 | Completion of 2 CEU credits o (More ...) | No | Yes |
| 5 | Three years of nursing experience | No | Yes |

863 865  867  869  Back

Fig 11

SYSTEM AND METHOD FOR ORGANIZATIONAL AND PERSONAL PORTFOLIO

FEDERALLY SPONSORED RESEARCH

No

SEQUENCE LISTING OR PROGRAM

N/A

BACKGROUND

1. Technical Field of Invention 707/10

The present invention is related to entering, manipulating, and accessing data in a computer system database, and specifically for creating, updating, tracking, managing and accessing individual data records.

2. Background of the Invention

The concept of a portfolio has evolved from carrying around objects that demonstrate ones abilities, as an artist might carry sketches to an interview to automated computer repositories. As the portfolio concept evolved and computers became common place professional workers have adapted the power of demonstrating accomplishments. As society and economies adapt to the profound changes that global economics are presenting; individuals, in particular, are increasingly forced to rethink their careers. With the trend to a service-based economy in many developed countries an individual's reliance on a single employer is no longer realistic for many. Adroit individuals have found that in a service-based economy a successful career requires application and integration of specialized knowledge into skill sets. The challenge to individuals is multifaceted; a current record must be immediately available for meeting certifications, job bidding and personal advancement, however, a resume is only a high-level snapshot and lists of "things" add little to fill the information gap. Additionally, many jobs require continuing education and even recertification as a condition for continued employment. Individuals need to have all relevant data available, and the ability to focus this information for selected audiences, rapidly. Accomplishing these challenges with simple approaches such as web-based interfaces utilizing HTML centric platforms does not provide adequate computational depth necessary to implement complex business rules and would not be reflected in the interface. Many of the tools available as "off the shelf" require the use of additional tools and customization to build the necessary support components. Aggregated repositories with resumes, certifications, continuing education, awards, specialization and other career relevant information have been shown valuable but unwieldy, difficult to maintain, monitor and update.

While professionals in the fields with more tangible products (art, graphics and entertainment) portfolios are the norm in such fields they do not lend themselves to more abstract professions such as medical, legal, and engineering. In these professions relevant information and data tend to be more complicated and require adjustment for individual audiences. A portfolio concept was initially proposed by Rita Monson [The International Society of Nursing Genetics]. This approach allows nurses to apply for certification by submitting an assembled paper portfolio for review. This portfolio was then individually duplicated and sent to evaluators for subjective review to grant certification. This process satisfies the informational needs but creates a massive paper burden with the resulting cost and handling problems.

Similar challenges are experienced by organizations one such example is designation of Magnet status for hospitals. Hospitals, to achieve Magnet designation, a recognition by the American Nurses' Credentialing Center which identifies a hospital's commitment to quality beyond meeting basic regulatory requirements for the purposes of improved patient outcomes and enhance financial viability. Included in these initiatives is the submission of nursing/professional portfolios for each staff member. This effort requires assembly, coping, submitting, and maintaining portfolios on a massive scale. Additionally, for all sizable organizations boxes of portfolio information must be submitted as part of the application process. The nature of archival data is that of a tomb, that is data stored in this manner is not dynamic and is difficult to interact with. This is in contrast to the demands of the market place that is dynamic and constantly changing requirements. Therefore to meet the current dynamic work place challenges there exists a necessity for a system with the following capabilities:

An intelligent automated organizational and personal portfolio management means for comprehensive aggregation of an individual professional development data from individuals and employee based organizations which functions to provide individually customizable repositories for individuals and employee based organizations, functioning as a single repository comprising:

- providing a complete hardware and software configured system;
- providing a stable functionally engineered software solution;
- providing a reliable functionally engineered software solution;
- implementing an improved system supportability with functional system architecture;
- interfacing through a collection of extensible and customizable metaphors;
- implementing an early warning communications;
- facilitating a complete format flexibility for user upload in system;
- facilitating a complete format flexibility for user download from system; and
- facilitating a flexible directory look up mapping by user defined keywords.

Additionally, there exists a need in the professional market place for a storage system and method that facilitates collection, organizing, managing, and maintaining portfolio information in an convenient, structured, maintainable, trackable, and customizable interface.

SUMMARY OF THE INVENTION

The present invention provides an intelligent and automated method for establishment, collection, and maintaining of organizational and personal portfolios. In relationship to the present invention the term intelligent refers to the systems program structure which facilitates simple user entry while performing complex operations and manipulations, transparent to the individual. These data operations and manipulations are performed in a software routine or "definitions engine" allowing rapid modification and extensions and high tolerance for change. The 'definitions engine' uses object-centric design patterns to build the user interfaces pages that provide the ability to add, view, update, list, and delete the information that is entered by users. This engine maps the user entry and interaction to the database tables, enforces data validation rules, builds needed drop down selection lists, and manages data rights and access based on authorized user security levels. The second engine is the 'reporting engine' which drives the data mining, reporting, and data analysis. This engine is driven and configured by metadata stored in database schema descriptor tables. This metadata determines the content, criteria, and composition of the applications reports. The reporting engine user interface allows users to select the data items on a report, manage and limit the scope and data inclusion criteria, and then produce and display the results. Additionally, users may customize interfaces and functions to improve their interactions with the present invention. Also multiple selected copies may be collected into repositories as the user desires. The present system functionality is offered as a complete package with hardware and software available through any internet connection. The combination of native code with design patterns to isolate repeated elements improves reliability and stability of system operation. Additionally, the functional decomposition of the system code using the classic approach of "structured analysis and design" and "code reuse" promoted by Yourdon and Shane facilitates a system with supportability and extensibility. Further, system code benefits from structure separating form (user interface) and function (the business process and logic) enhancing stability, reliability, and supportability.

The term automated is used to describe the actions by the resident code that categorize, store, aggregate and relate user information implementing what would be cumbersome and intensive activities by users.

A portfolio as defined by S. K. Bell provides a repository for historical information about an individual's career. Initial content of a portfolio would include a resume and curriculum vitae. A resume is typically a one or two page document containing professional data that includes demographics, education, goals and objectives and is updated annually. The curriculum vitae will afford collecting of much more detailed document listings of all the additional components of a professional career. Information such as committees one has served on, service activities, honors, speeches, publications, awards and actual examples of these artifacts (i.e. Scanned citations).

These portfolios once established on a host (organization such as employer or professional association) will allow the individual the capability to perform the following functions:
Create multiple portfolio profiles for different audiences,
Merely fill in blanks or select from drop down boxes to enter information,
Additional fields for untypical information may be added to portfolios,
Uploading of supporting documents,
View of current portfolio status is readily available as a snap shot through user interface "dashboard" with web links and documents,
Simple to interface to complementary database based software products for ease of integration,
Extensive reporting and data analysis at the organization level,
Multiple user options are available to share portfolios internally and with outside parties including: email, consolidated PDF generation, and printable hardcopy
Keyword mapping is implemented with techniques from industry knowledge experts with the ability to correlate specific careers, objectives, goals, licenses, certifications, credentials, training, and experience with keywords selected by the users to describe themselves,
Keyword mapping is implemented with techniques from industry knowledge experts that correlates specific careers, objectives, goals, licenses, certifications, credentials, training, and experience with keywords associated by users with the objectives and goals of a portfolio they are building,
Association keyword filtered choices and options feature expandability to include the full an available list at the click of a button,
The ability for knowledge experts to add new keywords and establish the associative relationships with the mix of available portfolio contents is facilitated,
Individuals can select who can view which versions of portfolio and email the chosen selection to select audiences as desired,
An all important function of reminders are generated and sent to users to alert them when updates or additional inputs are due.

Software security is architected to operate seamlessly with existing password protection installed in host's network. This is accomplished by allowing program access only to existing network users that are authorized and logged into the network. The requirement for retesting and/or recertification is a reality in some professions and others are threatening the same. In contrast to schema using retesting as the approach to competency; improved results have been shown by Nelson, E. A., and Porter, S. F. using competency-based systems. Competency-based systems focus on the actual work experience and individual advancement rather then retesting of basic concepts. These studies have shown a marked improvement in individual's performance, job satisfaction, and career growth. Individuals using competency-based systems are able to utilize the most appropriate method of instruction or training that is compatible with their individual workload and schedule. The advancement of e-learning allows for effective yet tailorable progress by individuals. One method of implementing competency-based systems involves credentialing and privileging programs where competency based education defines performance expectations as criteria. The present invention provides a dynamic platform with organizational and personal current status that can be used to immediately establish credentials and privileges.

When organizations need to schedule critical tasks they can match credentials and privileges with portfolios that are designated available to the organization. These capabilities allow interoperability and integration with other (learning management systems and such) functional software. This ability reduces user complications and facilitates improved task perform with greater job satisfaction for scheduling qualified individuals. Additionally, when organizations desire to qualify for select status such as magnet status with health care organizations they merely submit the relevant information with their collection of individual portfolios.

BRIEF DESCRIPTION OF THE DRAWINGS

FIG. 5 shows a typical screen where a user has selected My Education.
FIG. 7a shows an expanded list of all education history.
FIG. 7b shows an expanded task list.
FIG. 8 shows a portfolio viewed in summary form.

FIG. 11 shows a screen for creating an individual's list of requirements.

DETAILED DESCRIPTION OF THE DRAWINGS

Figure 1:
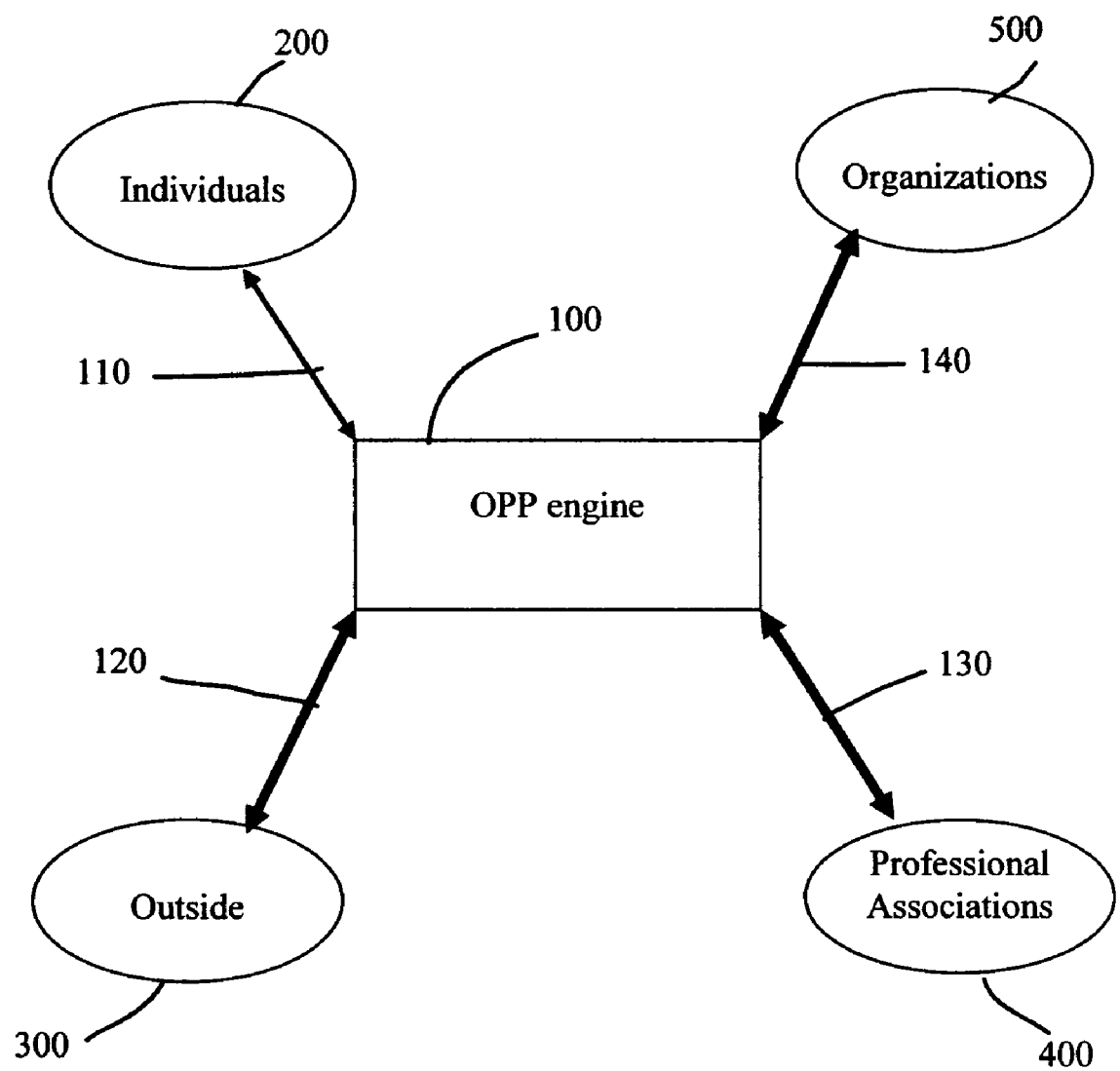
FIG. 1 shows the high-level OPP interface.

FIG. 1 shows the high-level Organizational and Personal Portfolio (OPP) interface. The core of the OPP is a collection of structured software; an OPP engine 100. Engine 100 provides interface to connectors such as an individuals 200 through network a connection 110. Individuals 200 accessing engine 100 over connection 110 can create, load, modify and supervise their information. Engine 100 also provides access to an outside 300 individuals or organizations over a network connection 120. Engine 100 is implemented with concepts from highly-available 24/7 manufacturing systems design. The basic principles for the development of the engine 100 are: Use of design patterns to isolate the repeatable elements in the database, user interfaces, and code processes. Functional decomposition using the classic approach of "structured analysis and design" and "code reuse" promoted in the 1970's by Yourdon and Shane. Additionally, the structured approach in engine 100 features separating form (user interface) and function (the business process and logic) to the extent possible. Outside 300 individuals or organizations are considered those not listed in host's access list. Engine 100 additionally provides access to a professional associations 400 over a network connection 130. Engine 100 provides access to an organizations 500 over a network connection 140. Individuals 200 select which components are visible to outside 300, associations 400, and organizations 500. Connections 110, 120, 130, and 140 are typically over standard intranet, Internet, or similar network access connections. The structured development combination of mission-critical, highly available, functionally decomposed, and functionally separated code produce a stable, reliable, modifiable, and extensible interfaces to improve user experiences and minimize support requirements.

Figure 2:
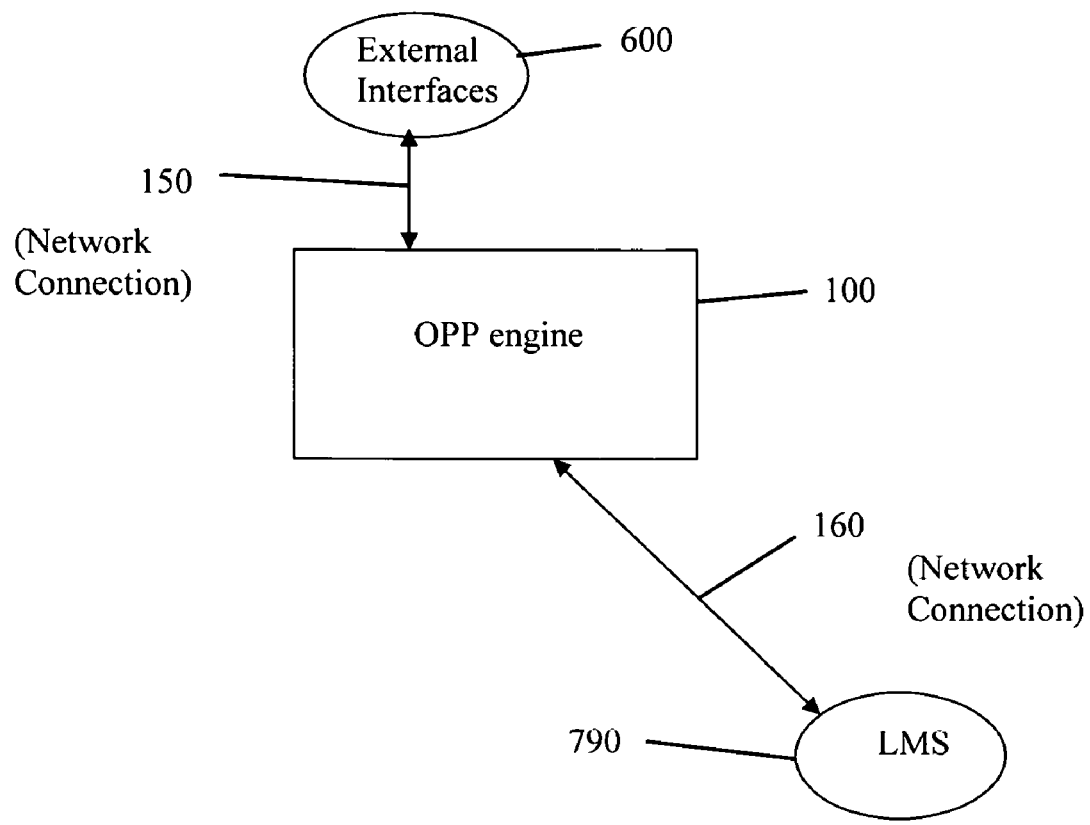
FIG. 2 shows a typical OPP configuration.

FIG. 2 shows a typical OPP configuration. Engine 100 is shown connecting to an external interfaces 600 (representing a collection of connectors 200, 300, 400, and 500 on FIG. 1) returning to FIG. 2 over a network connection 150 (representing a collection of connections 110, 120, 130, and 140 on FIG. 1). Engine 100 also facilitates connection of Learning Management System (LMS) a software engine 790 over a network connection 160. Connections 150 and 160 are typically over standard intranet, Internet, or similar network access connections. Typically the support hardware and software are implemented in a single server configuration with users logging in by internet connections. Engine 100 provides the interfaces that build, access, and update individuals' information. Engine 790 provides the data mining, reporting, and data analysis. The basic principles for the development of the engine 790 follow the same implementation approach as the engine 100 specifically: Use of design patterns to isolate the repeatable elements in the database, user interfaces, and code processes. Functional decomposition using the classic approach of "structured analysis and design" and "code reuse" promoted in the 1970's by Yourdon and Shane. Additionally, the structured approach in engine 100 features separating form (user interface) and function (the business process and logic) to the extent possible. Engine 790 follows rules and restrictions as selected by interfaces 600 to determine what data are available over interface 150.

Figure 3:
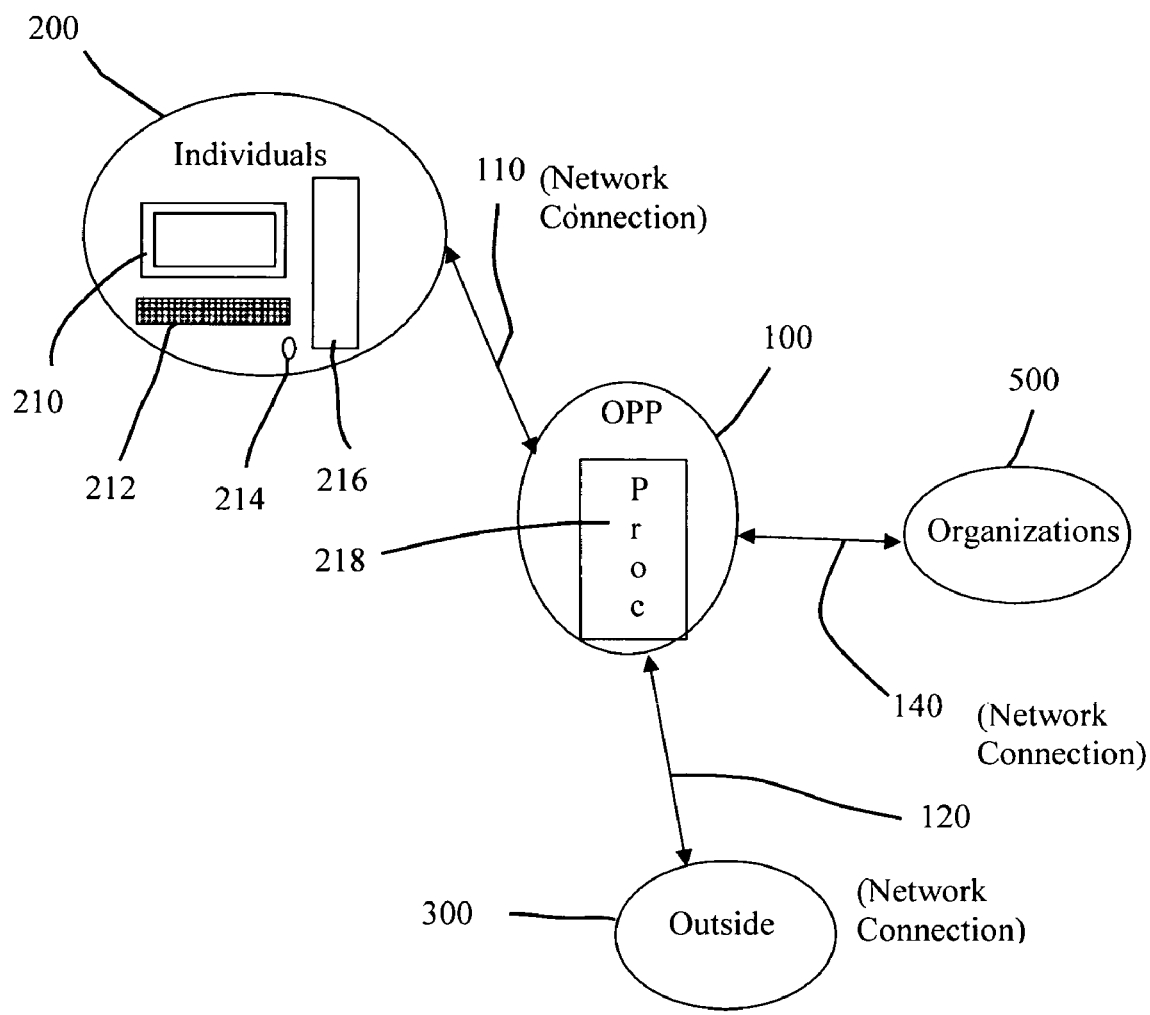
FIG. 3 shows individual entry access over a workstation.

FIG. 3 shows individual entry access over a workstation. Individuals 200 access is shown with a typical user interface, typically a display 210, a keyboard 212, a mouse 214 and a processor 216. Interface 110 is shown connecting individuals 200 to engine 100. Engine 100 is shown containing a processor 218 for software supervision, loading, operation and distribution of data. Typically engine 100 is a centrally located complete hardware and software configured system. Utilizing this configuration with structured programming software construction and function system architecture a stable, reliable, and supportable system will give the users a rewarding experience. Organizations 500 access is shown connected to engine 100 over connection 140. Outside 300 access is shown connected to engine 100 over connection 120. The connections 120 and 140 will facilitate emailing and viewing of portfolios by others. Typically connection 120 and connection 140 are standard communication interfaces with hardline, fiber optics, or wireless connection configurations. This configuration is shown as typical and details of individuals 200, organizations 500, and outside 300 can be most any interface that can communicate with host's intranet connection (140) or Internet connection (120). In the case of small or single user applications engine 100 can operate with no outside interfaces. A printer is not shown but would typically be used for hardcopy printouts.

Figure 4:
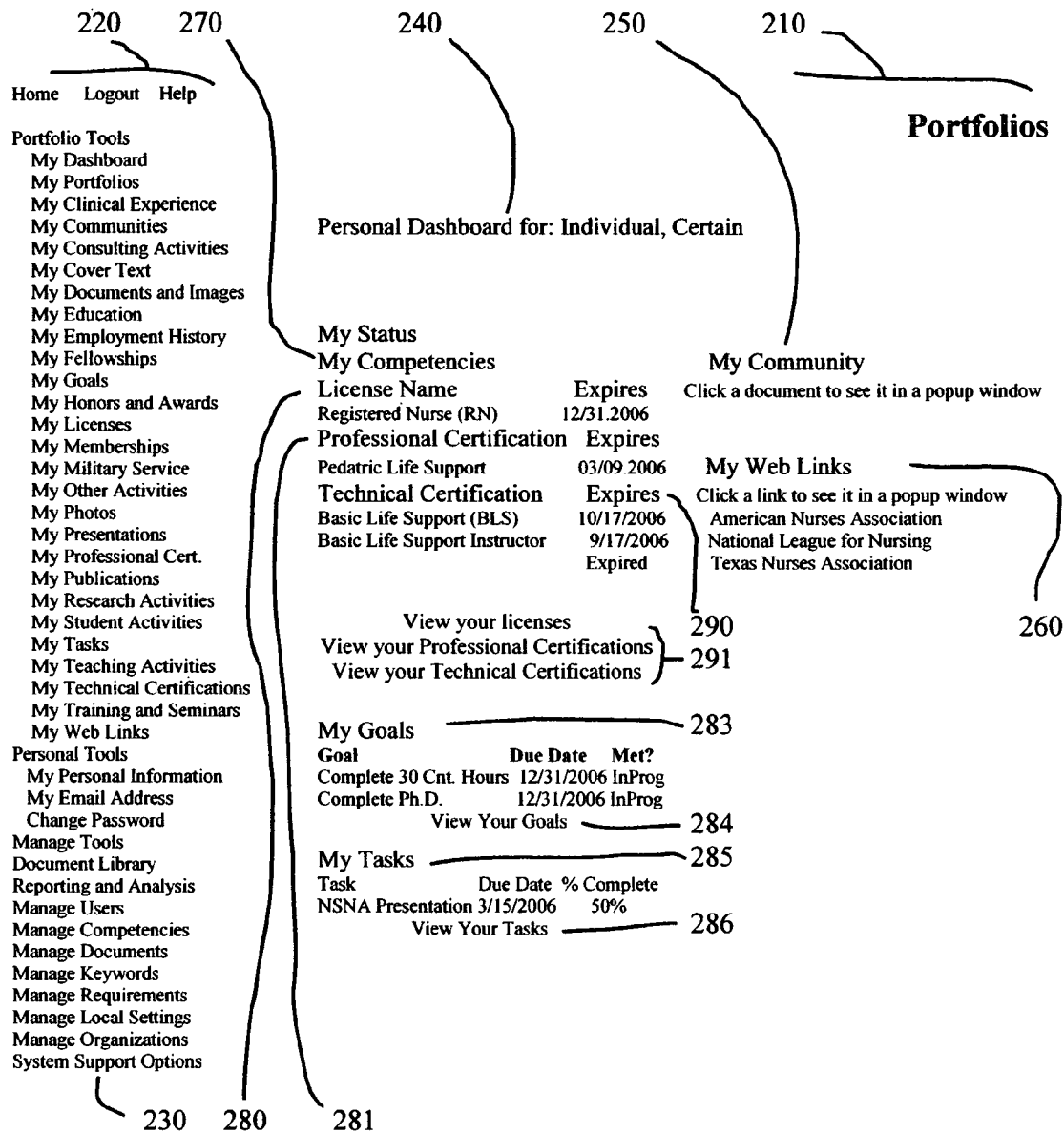
FIG. 4 shows a typical monitor with an initial screen.

FIG. 4 shows a typical monitor display 210 with a navigation area 220 that is seen by users when they login. Contained in the area 220 are navigation choices. The display of choices on area 220 are determined by the security level of the individual user when data are entered. A personal dashboard 240 column is shown on center right of screen 210 providing a snapshot of key individual information. The multitude of choices represented on display 210 represent the collection of extensible and customizable metaphors the system offers. The use of predefined routines facilitate a simple user interface to hide the complexity of the system program improving the user experience. The contents of panels on the dashboard 240 are unique to each user by their selection when initially entering (or updating) information. The information displayed on this typical display 210 are partially opened (details displayed) and others are displayed only as categories that can be expanded to meet users requirements for discussion purposes. Typical information contained in dashboard 240 are; a my community 250 panel (not expanded) which enables system support staff or hospital administrators to add shared links to reference materials and other sites or applications, a my web links 260 which lets the individual user create a list of favorites to web sites that they visit frequently, key information on the dashboard 240 demonstrates the system flexibility for users to adjust content and format to include documents and examples to be uploaded or downloaded or shared by hardcopy or email. The dashboard features a my competencies 270 this area shows all of the users licenses listed as a license name 280 (expanded), a professional certification 281 area (expanded) and a technical certification 290 area (expanded) each contain the date that they expire. An area of 3 hot links 291; view your licenses, view your professional certifications, view your technical certifications, is shown users can select these areas for expansion to view details, make associations and define selected keywords similar to certification 290 area that has been expanded showing details with technical certifications and expire dates. These data provide timely reminders of key dates and events for users. In addition, expiration reminder notices are automatically generated by the engine 100 (FIG. 1) and emailed to the users 60 and 30 days before a license or certification expires. A my goals 283 area (expanded) is provided for user goals listing, each item has a due date and a met? area for user feedback on goal performance and timeliness. Immediately below goals 283 is a view your goals 284 area for further expansion and modification. A my tasks 285 area (expanded) is provided for listing of user tasks, each item has a due date and a met? area for user feedback on task performance and timeliness. Immediately below tasks 285 is a view your tasks 286 area for further expansion and modification.

Additional area 230 items and dashboard 240 panels can be added whenever the need arises by requesting items from network administrator. There are maintenance interfaces built into the application that allow support staff to add new menu items, change captions, update page instructions and help text, change the security access levels of other pages, and add more items to any drop down selection box in the application. The interface has been designed to be visually appealing with a low graphic content. This makes the application responsive even for users with slower or dialup Internet connections or mobile users. Keeping the interface fast and intuitive, with a small traffic footprint, is a major design feature of the application.

FIG. 5 shows the display 210 where a user has selected My Education from area 220 on FIG. 4 to update or modify My Education. Returning to FIG. 5 display 210 now displays Update Education a titled screen 610 information. A navigation area 611 is shown for return to previous screen by selecting this function. Buttons for navigation feature an update button 612 and a cancel button 614 entries are provided at the right top and bottom of display 210; these (button 612 and button 614) are functionally the same and are provided redundancy for convenience of the users. The button 612 will save the current information when selected. The button 614 will ignore the new inputs when selected. The Standard information entry is facilitated by the simple type in boxes such as for a School Name 616 and a School City 618. Information that is expected to be specifically categorized such as a State 622, Year Awarded 621, and a Degree Level 620 is provided with drop down type selection boxes to avoid ambiguity or confusion. A drop down arrow 623 is included at the end of line for state 622 and level 620 where a user can enable the drop down list by clicking on the respective arrow 623. The data displayed on screen 610 is a typical data entry form that is created by the 'definitions engine'. The controlling metadata for this page includes but is not limited to the database table, specific data items, criteria for building the drop down selections, required fields, data element sizes, and data validation rules. The data capture process is very simple for the users, as the engine manages and masks all of the business logic complexities. Users do not need to learn a new lexicon to make effective use of the portfolio application. The interface utilizes terms that are already familiar to the target user communities.

Figure 6:
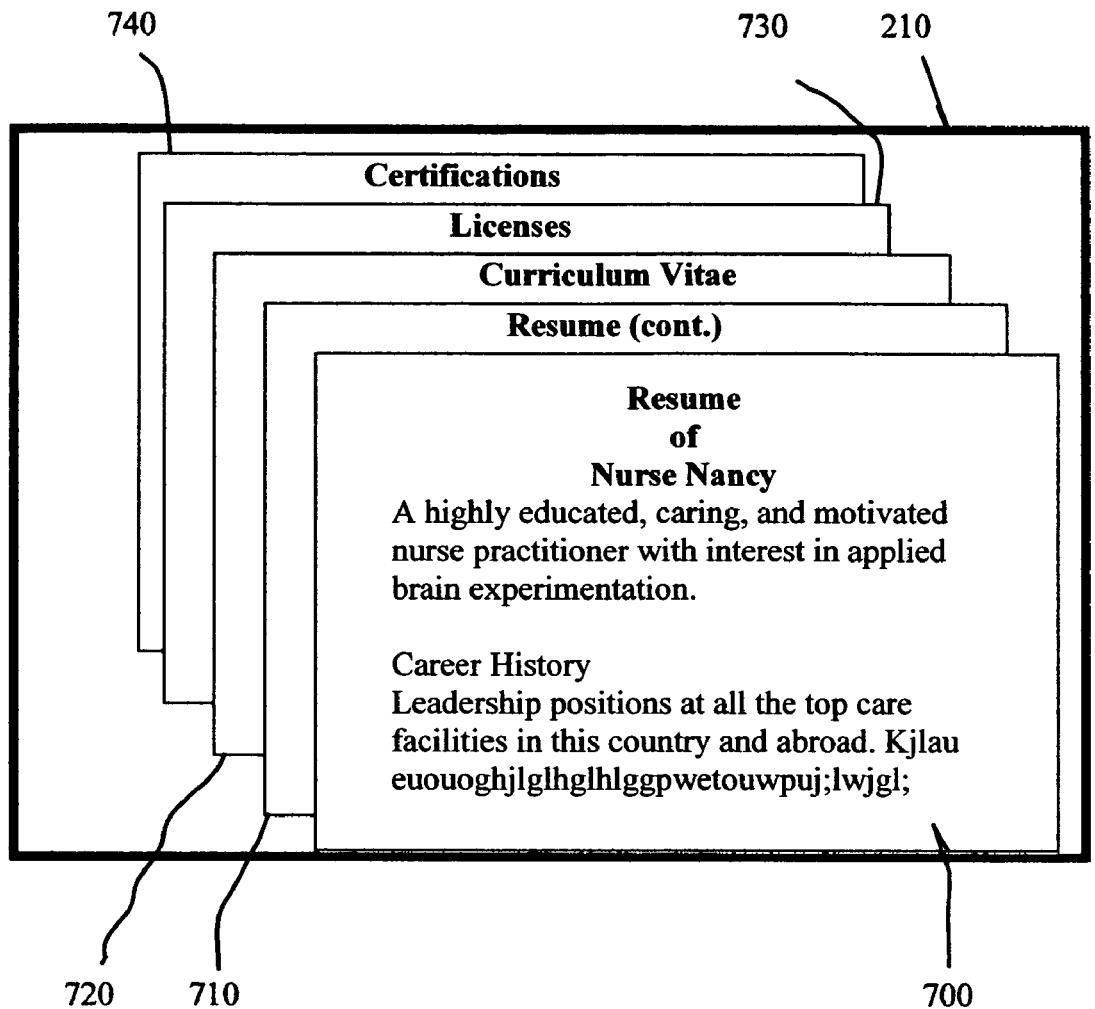
FIG. 6 shows a typical monitor displaying work products.

FIG. 6 shows a typical display 210 displaying work products. Bit map pages are displayed on display 210 to illustrate typical work products from OPP system as these products would be viewed when printed on paper. A page of a Resume 700 is shown foremost in display 210. Content on these pages (resume 700 and a resume (cont) 710) is a typical 2 page resume aggregated by engine 790 (FIG. 2) from user entered data and data manipulation techniques discussed in FIG. 5. Returning to FIG. 6 a Curriculum Vitae 720 page is shown it is also an aggregation by engine 790 (FIG. 2) from user entered data and data manipulation techniques discussed in FIG. 5. Returning to FIG. 6 a Licenses 730 page is also shown and is compiled from information directly entered by user through selection of My Licenses from area 220 on screen 210 in FIG. 4 and/or Licenses 280 also on screen 210 FIG. 4. Returning to FIG. 6 a Certifications 740 page is additionally shown and is compiled from information directly entered by user through selection of My Certifications from area 220 on screen 210 in FIG. 4 and/or Certifications 290 also on screen 210 FIG. 4.

FIG. 7a shows an expanded list of all education history that has been entered by a user. The view on display 210 is titled education list 751. A navigation area 611 is shown for return to previous screen by selecting this function. An area 753 is provided for edit instructions, edit help, and help these aids are accessed by user selection when needed and provide supplementary instructions. An area 755 is provided for users to include new education entries by selection of this area. The system flexibility allows a choice of formats from scanning in documents to pictures or awards for inclusion. Additionally, the same flexible format is available for hard copy or emailing of portfolio items. A school name 757 title heads up the title column of school records previously entered. A year awarded 759 title heads up the column of years associated with school records previously entered. An actions 761 title heads up the action choices for the specific school records. The actions 761 choices include view, update, delete, audit, documents, and photos. These entries can then be added to one or more portfolios. Users, by selecting actions 761 can associate selections (from name 757) with one or more documents or photographs. The documents and photos are uploaded to the application, and then selected for association with related entries. In this case a scanned copy of a diploma can be uploaded and then linked to the specific education item that is entered by the user. The uploaded documents and photos become item that can be searched by keywords for user and reviewer convenience.

FIG. 7b shows an expanded task list. When a user creates a portfolio they can indicate that the portfolio will be assembled to meet a specific requirements list. The results is a set of tasks being added to their personal task list. When a tasks 285 on FIG. 4 is selected and expanded the user screen will show FIG. 7b; a my tasks 765 on display 210. A column task 767 heads up the titles of entered tasks. A date due column 769 heads up the dates associated with the requirements of the specific task. The system (engine 100 FIG. 2) through the structured programming techniques will back count the entered due dates and send (by email) to the user compliance warnings 60 and 30 days prior to entered due date. A % complete 771 column heads up the percentage of progress towards completion of the specific task. A view your tasks 773 selectable area is provided for user modification and updating of task information. When entered or modified these requirement tasks will then appear on the dashboard as shown presently. The user can also elect to have email reminders sent to them as ticklers of the tasks they need to complete for a specific set of requirements or portfolio by selecting the respective line in complete 771 column.

FIG. 8 shows a portfolio viewed in summary form. In summary view display 210 features a displayed view portfolio title 777. A navigation area 611 is shown for return to previous screen by selecting this function. A column with portfolio item titles 779 is shown with typical entries. A second column 781 is shown with details corresponding to titles 779. An edit instructions 785 is provided as a selectable area for users to edit portfolio item handling. A navigate back 783 button is provided on the top and bottom of display 210 for user navigational convenience. The title 777 screen provides a simple way to verify that a portfolio contains all of the items the user wants to include. Additionally, the 'Education' section in column 779 shows all of the education history items in column 781 that were selected on FIG. 7a.

Figure 9A:
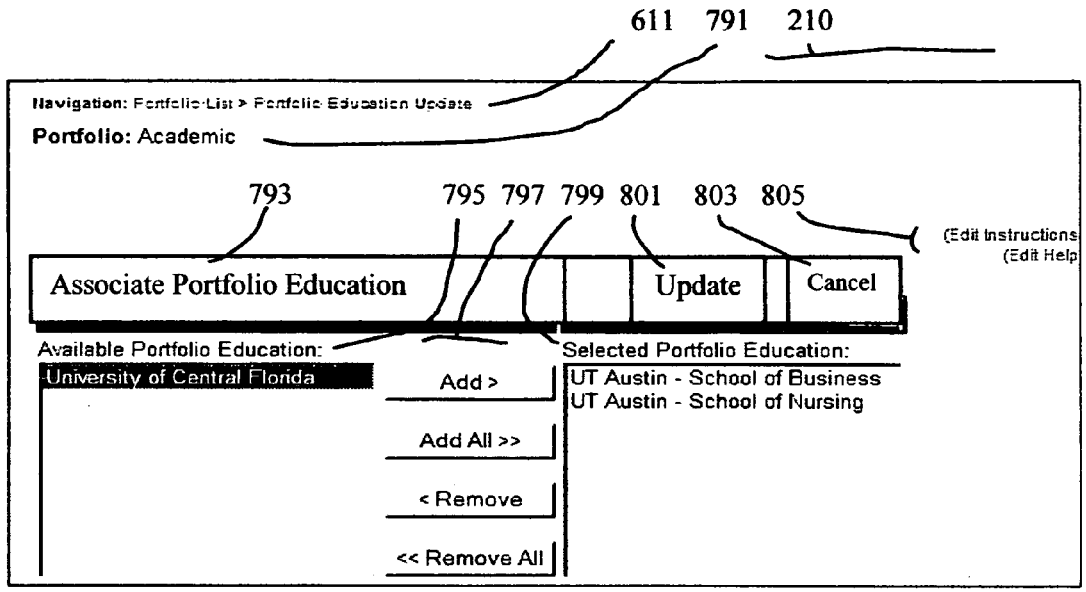
FIG. 9a shows the interface used to add specific items to a portfolio.

FIG. 9a shows the interface used to add specific items to a portfolio. The display 210 features a title of portfolio academic screen 791. A navigation area 611 is shown for return to previous screen by selecting this function. The screen 791 provides an associate portfolio education 793 heading with a detail title available portfolio education column 795 with a list of schools where education was received. A collection of buttons 797 is placed between column 795 and a selected portfolio education column 799. The buttons 797 simplify users adding and removing of individual schools. An update button 801 is provided for user selection. When a user selects button 801 the current inputs are saved. A cancel button 803 is provided for user selection. When a user selects button 803 the current input is ignored and erased. In this case the user is selecting the education items that are to be included on their 'academic' portfolio. An area 805 with hot selection captions is provided for editing instructions and help. Users can select the desired edit function by selecting the appropriate caption within area 805.

Figure 9B:
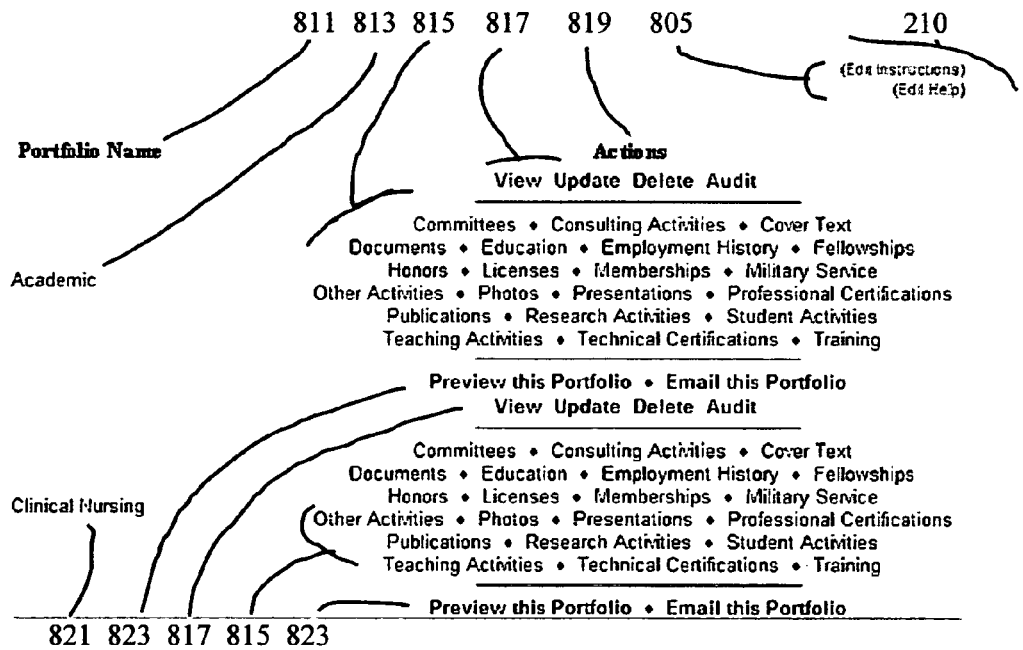
FIG. 9b shows the tools to allow users to create multiple portfolios.

FIG. 9b shows the tools to allow users to create multiple portfolios. The display 210 on this screen has a title portfolio name 811. The area 805 with hot selection captions is provided for editing instructions and help. Users can select the desired edit function by selecting the appropriate caption within area 805. The predefined routines implementing the structured programming allow simple uploading and downloading with this simple interface. A left most academic area 813 of display 210 allows the user a choice between area 813 and a clinical nursing area 821 these collections can individually have a different focus or objective. A central area is headed by a title actions 819. Immediately below actions 819 is a pair of command area(s) 817 (located below actions 819 and middle of display 210) that allows the user to implement (view, update, delete, and audit) the specific selection by selecting the desired function. The lower portion of actions 819 has a collection of items 815 for inclusion into area 813 by user selection. A user may select the specific area 817 and item(s) 815 to include in the desired portfolio. An area 823 is provided immediately below item(s) 815 for either previewing or emailing of the portfolio collection. An area below area 813 is titled clinical nursing area 821. The area 821 is for a specific portfolio for clinical nursing this collection can be tailored for most any subject or requirement. Below the middle area(s) 817 is a second collection of items 815 for eligibility of inclusion into area 821 portfolio. Below second item(s) 815 is a second area 823 for either previewing or emailing of the portfolio collection. This figure shows that two portfolios (multiple portfolios instantiations are supported) academic (area 813 and clinical nursing 821) have been created. The area 813 emphasizes academic experience, and the area 821 showcases clinical nursing. When a user desires to link previously entered items to a portfolio, a click on the appropriate topical links in the area 815. When a portfolio is ready it can be previewed by selecting the preview this portfolio in the area(s) 817 and also sent to others by email by selecting the email this portfolio in the area(s) 817. Items selected in the current figure will determine the keyword mapping for the specific portfolio. The preview selection in area 823 displays the portfolio as a PDF file.

Figure 10:
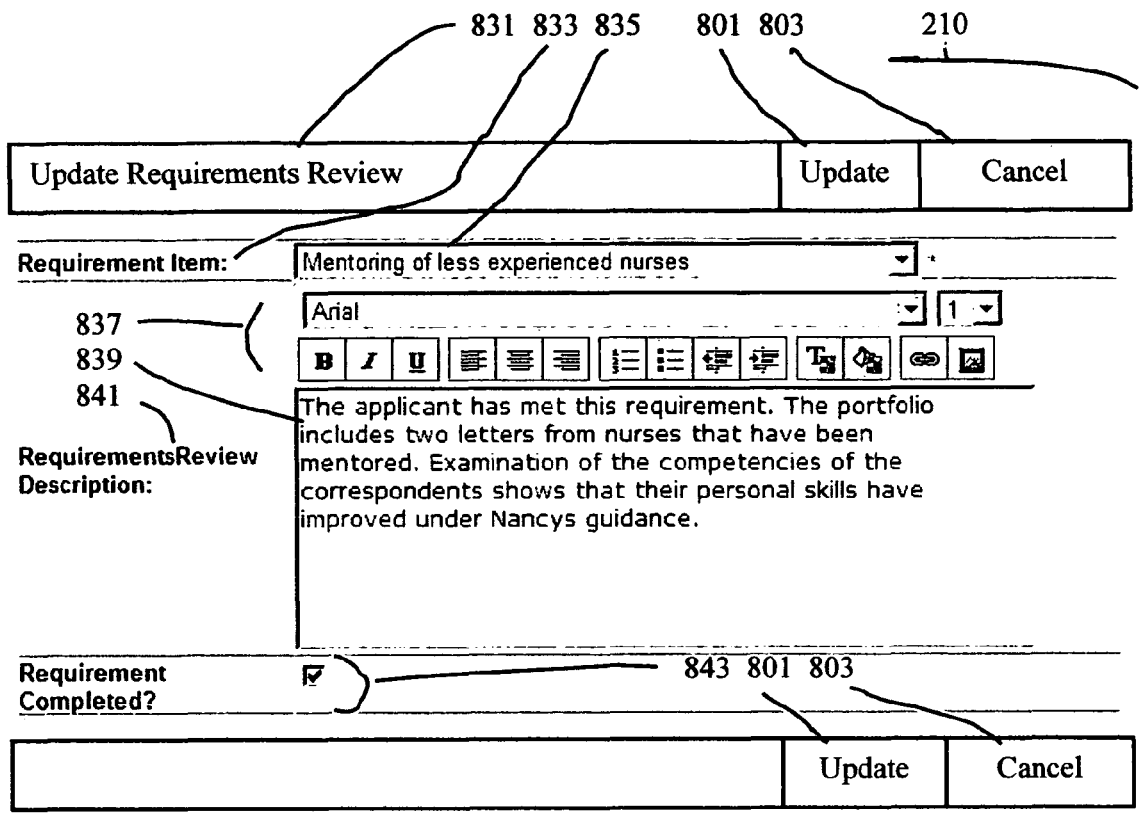
FIG. 10 shows an item review/approval screen.

FIG. 10 shows an item review/approval screen. The display 210 shows a title update requirements review screen 831. Directly below screen 831 title is a requirement item 833 area. To the right of item 833 is a title display 835 that reflects the item being reviewed. To the right or item 833 is a drop down arrow 623 for item 833 viewing and selection. An update button 801 is provided for user selection. When a user selects button 801 the current inputs are saved. A cancel button 803 is provided for user selection. When a user selects button 803 the current input is ignored and erased. A word processing command bar 837 is provided below display 835 for the reviews convenience when entering or editing text to complete the review. A word pad 839 is provided for reviewers to enter or edit comments on the item being reviewed. A title bar 841 is to the left of the pad 839. An area 843 contains the title requirements completed? with a check box for the reviewer when completion is judged by the reviewer achieved. A second set of button 801 and button 803 are presented on the bottom of screen 831 for reviewer's convenience. When a portfolio with associated requirements is submitted for review and approval, a coordinator will assign it to one or more reviewers. A task is added to the 'my tasks' (area 285 in FIG. 4) section of the dashboard 240 for the reviewers. Each reviewer has the ability to enter comments about the portfolio as a whole, and the individual requirements that are addressed by the portfolio. When the individual reviewers have completed their assessment of a portfolio, the coordinator can view the aggregated comments, summary and details for the completion status of each requirement item, and make a determination if the portfolio as a whole will be approved. Specific items can be remanded to the user who submitted the portfolio for additional information.

FIG. 11 shows a screen for creating an individual's list of requirements. In this figure the display 210 has a titled view requirements screen 847. Below the title is a requirements name 849 area with an area 851 for the display of the selected title in this case career advancement to RN2. A back button 783 and edit instructions area 785 is provided for user navigation. Immediately below name 849 is a requirements description area 853 that displays details of the item displayed in area 851. Immediately below area 853 is a requirements instructions 855 where specific instructional details of the item in area 851 are displayed. Immediately below instructions 855 is a requirements author 857 where the responsible parties name would be entered. Immediately below author 857 is a requirements version 859 where the applicable version of the requirement will be displayed, in this display version 11. Immediately below version 859 is an area titled released? 861 where the release status of the requirement is displayed in this case no is displayed and the requirement is not released. A sequence column 863 is provided for listing order of requirements with a second item text column 865. The column 865 highlights the subject of the requirements for quick review by viewers. A third caption? 867 displays the presence or lack of a caption associated with the requirement. A forth column titled active? 869 displays status of the requirement. A second back button 783 is available at the bottom of the screen for user navigational convenience. This portfolio application functionality includes the ability to create lists of requirements. These requirements lists can be predefined for a specific vertical market, such as nursing, and can also be created by individual organizations to meet their specific needs. Examples would include a requirements list of the items that need to be in a portfolio that will be used to internal career advancement, as shown above, or to apply for a specific advanced credential from an accrediting body.

Figure 12:
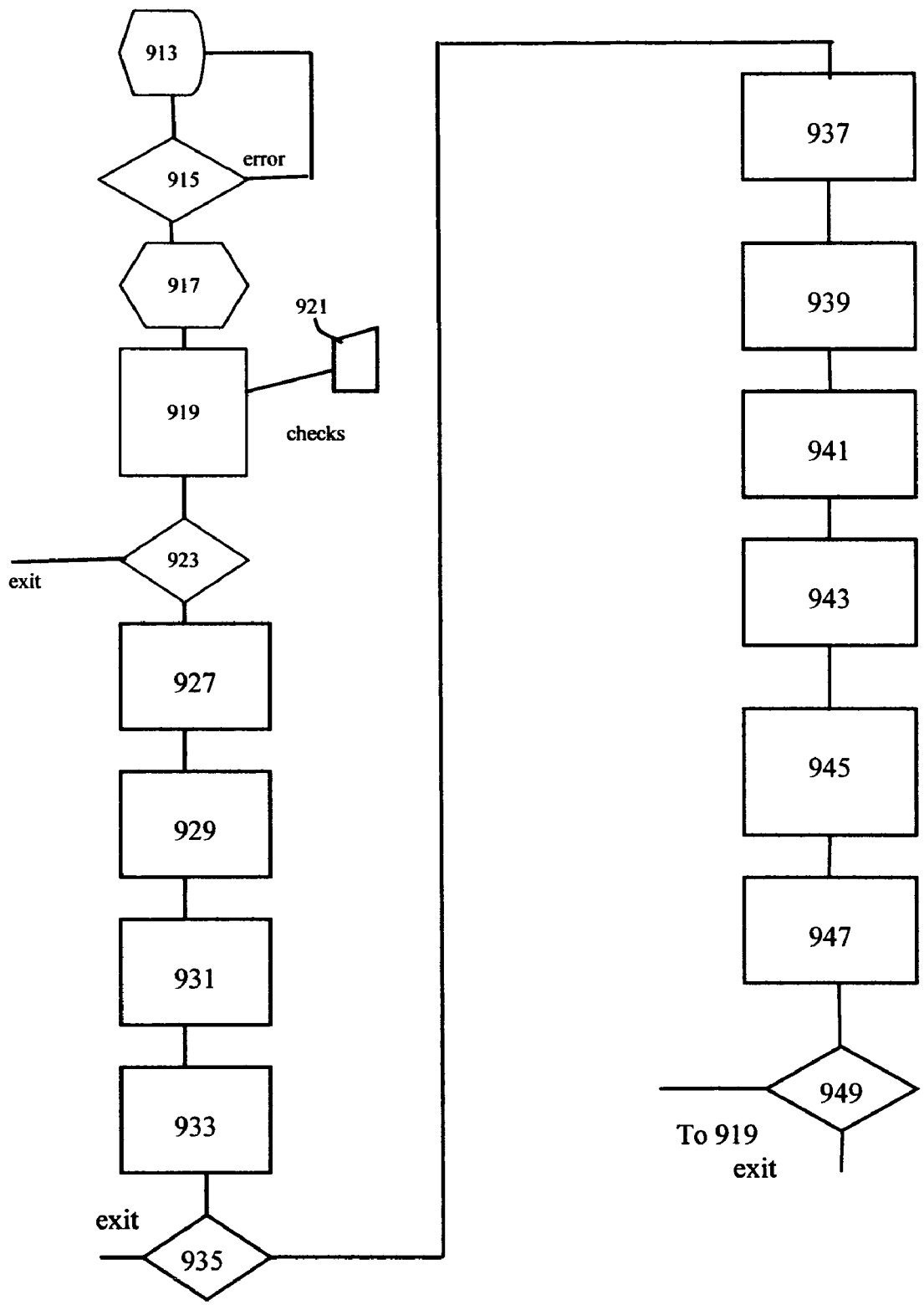
FIG. 12 describes a typical transactional program flow.

FIG. 12 describes a typical transactional program flow. Typically the present system is hosted by the provider and eligible individuals and organizations gain access over the internet. To be an eligible user a licensed customer can connect to the host. Information and licensing may be obtained by visiting the web site www.decisioncritical.com. Individuals and organizations may obtain an identification name and password from compliance manager or network administer in a function 913 as instructed through the above web site. Once a user has an account and an identification name and password the entire process is automated in that the user can enter data, edit, update, and manage their portfolios (multiple as needed) in a single sitting with no outside assistance. Following obtaining an identification name and password the next step is a decision 915. Functionally; a staff member enters identification name and password obtained from the previous step function 913; if the identification name and password match the staff member is allowed to enter a process 917 where staff member information is entered, if a problem exists with the identification name or password the program returns through the error route to function 913 for the staff member to contract the compliance manager for correction of the defective logging information or techniques. When the decision 915 criteria are met the user proceeds to process 917. In process 917 the user or staff member is prompted to enter information that includes but is not limited to skills, competencies, licenses, and certifications. The interface to process 917 is typically interfaced as in FIG. 4. The software will aggregate, store, and retrieve the information when prompted following entry. The system has additional capabilities for document scanning and similar records capture but the basic function of capturing necessary competencies will be discussed herein. Returning to FIG. 12 a supervisor approval process 921 is shown, this process 921 a typical interface for process 921 is shown in FIG. 10 where the requirements are reviewed. The process 921 will perform quality control the functionally engineered software will allow keeping inputs in the system without being posted until process 921 has approved the entries, returning to FIG. 12 on data entered in a process 919 for accuracy and correctness. Any exceptions will be blocked and reviewed with staff member. The system architecture being a single repository can quickly access the user requests, inputs and update in rapid time, improving the user experience. After initial data entry in process 919 staff member can elect in a decision 923 to either continue and fill additional screens or exit the system a typical interface for process 919 is shown starting on FIG. 4. Returning to FIG. 12 a function 927 follows process 919 when users elect to continue system interaction. In function 927 a staff member can track and review entries and results from recent activities or what requirements may be upcoming. Following activities in function 927 a function 929 allows staff members to review reports and summaries of their history and current profile. Following activities in function 929 a function 931 allows management of records and files and includes entry, and creation of special categories selection of specific and multiple portfolios for selected audiences. Finally a function 933 allows staff member to update records for typical data records maintenance such as credential update. An update decision 935 allows program to send message to supervisor when information requiring approval, certification, or verification is entered, or when completed simply exit program. When a user desires complete system inputs the line to a function 937 will facilitates the user updates of personal demographic details and selection of a set of keywords that assist in describing the user and their objectives. The screens in FIG. 5, FIG. 7a, FIG. 7b, and FIG. 9b will assist the completion of user profile data. Returning to FIG. 12 continuing to the submission of documents, pictures, and data is an upload function 939 is accessed through the FIG. 4 area 230 selecting My Documents and Images, or the appropriate item to be uploaded, and submitting the item. Returning to FIG. 12 continuing to a function 941 keyword associations are selected in FIG. 9b to help define the user experience and user interest. Returning to FIG. 12 continuing to a function 943 user choices can be accomplished on FIG. 9a to further define the education the user has input. Returning to FIG. 12 continuing to a function 943 users can implement choices of what content is seen by specific viewers and manage multiple versions of portfolios as described in FIG. 9b. Returning to FIG. 12 continuing to a function 945 users may accomplish a portfolio review with this function as shown in FIG. 8 here a complete high level of the selected portfolio is available for review, edit, and approval by the user. Returning to FIG. 12 continuing to a function 947 users can import and export portfolios and items through FIG. 4 and selecting System support options in area 230. When reporting and analysis is desired the user selects reporting and analysis item in area 230. A complete compliment of compatible systems is available through system support, as described in FIG. 2 learning management systems, staffing solutions, and checklists are available through this function. When a user has completed the desired functions they may either an exit 949 (sign out) return to process 919 and continue.

A suitable discussion of structured software engineering techniques as implemented in the present code is disclosed in more detail in a collection of Yourdon's works is listed at http://www.unt.edu/isrc/Faculty/bios/YourdonBio.pdf#search=%22yourdon%20structured%20programmin%22. Other references can be found at Microsoft Solutions Framework—Goals, Principles and Models http://en.wikipedia.org/wiki/Microsoft_Solutions_Framework and Patterns and Software: Essential Concepts and Terminology http://www.cmcrossroads.com/bradapp/docs/patterns-intro.html, also Just Enough Structured Analysis by Ed Yourdon http://www.yourdon.com/strucanalysis/index.html. The subject matter of which is hereby incorporated by reference in it's entirety into this disclosure Operation The method of operating the system for organizational and personal portfolios begins with the user following the operational program flow described in FIG. 12. The operational flow will step the user through:

Obtaining a license,
Obtaining a user ID and password,
Logging on to the system,
Viewing Portfolios,
Creating, reviewing, editing, and correcting portfolios,
Maintaining portfolios,
Updating portfolios,
Creating multiple versions of portfolios,
Sharing and emailing of portfolios,
Reviewing portfolios, and
Expanding system functionality.
The user may sign out or continue as desired.

DESCRIPTION OF THE PREFERRED EMBODIMENT(S)

In the preferred embodiment a host will the central system hardware and software and customers and users will access system functionality over the internet. The structured programming techniques and program flow as described in FIG. 12. The structure of the operational computer configuration should reflect FIG. 1 functionally. The operational configuration of the preferred embodiment also reflects FIG. 2. The system interface of the preferred embodiment should reflect FIG. 3. The entry screen is the users dashboard in FIG. 4. System products from the preferred embodiment are disclosed in FIG. 6. Hardcopies and emailable PDF files can be obtained from FIG. 9b or FIG. 4.

What is claimed is:

1. A computer-based, automated organizational and personal portfolio management system for aggregation, storage, and retrieval of professional development data for an employee-based organization, comprising:
   a processor;
   a computer repository coupled to the processor;
   a memory configured to store program instructions executable by the processor to implement at least two professional development software engines comprising:
      a professional development definitions engine configured to provide a user with a collection of one or more interface pages that enable users to add, view, update, and delete professional development data; and
      a professional development reporting engine configured to access a collection of metadata items stored in database descriptor tables, wherein users can select from the metadata items to control the scope of professional development data included in two or more different reports;
   wherein the program instructions are further executable by the processor to implement a method comprising:
      establishing on the computer system or the computer repository, and by using the professional development definitions engine, two or more professional development data portfolios, wherein each of at least two of the professional development data portfolios is associated with a different employee of the employee-based organization;
      collecting, into at least two of the professional development data portfolios, professional development data for at least two of the employees of the organization associated with the portfolio;
      aggregating at least two of the professional development data portfolios, the aggregating including professional development data of two or more of the employees of the organization; and
      generating, for at least one aggregation of professional development data portfolios that includes professional development data for at least two employees of the organization, two or more organizational-level professional development reports, wherein at least one of the organizational-level professional development reports includes data for the at least two of the employees that is different than the data included in at least one other of the organizational-level professional development reports for the at least two employees.

2. The system of 1, wherein the program instructions are further executable by the processor to implement:
   enabling access, by a first audience, to a first one of the two or more organizational-level professional development reports; and
   enabling access, by a second audience that is different from the first audience, to a second one of the organizational-level professional development reports.

3. The system of claim 1, wherein the professional development definitions engine is further configured to receive keywords defined by a user and to correlate the user-defined keywords with specific careers, objectives, goals, licenses, certifications, credentials, training, or experience.

4. The system of 1, wherein collecting, into at least one of the portfolios, professional development data for the employee of the organization associated with the portfolio comprises uploading to the computer system one or more documents or images evidencing professional development of the employee.

5. The system of 4, wherein the program instructions are further executable by the processor to implement:
   linking, by the computer system, at least one of the one or more uploaded documents or images evidencing professional development with at least one item that has been entered by the user; and
   searching by keyword, on the computer system, for the at least one linked uploaded document or image.

6. The system of claim 1, wherein the system is further configured to generate reminders to the user of key dates and events associated with the careers, objectives, goals, licenses, certifications, credentials, training, or experience.

7. The system of claim 1, wherein the program instructions are further executable by the processor to implement:
   associating one or more credentials or privileges with a task to be performed by the employee-based organization;
   automatically matching the one or more credentials or privileges with at least one of the portfolios; and
   scheduling the task to be performed based on the matched at least one portfolio that matched the one or more credentials or privileges.

8. The system of claim 1, wherein the program instructions are further executable by the processor to implement displaying at least one of the organizational-level professional development reports.

9. The system of claim 8, wherein such displaying includes one or more links to one or more documents or images.

10. A computerized method of aggregation, storage, and retrieval of professional development data for an employee-based organization on an automated organizational and personal portfolio management system, comprising:
   providing a computer system configured to implement at least two professional development software engines, wherein at least two of the professional development software engines include:
      a professional development definitions engine configured to provide a user with a collection of one or more interface pages that enable users to add, view, update, and delete professional development data; and
      a professional development reporting engine configured to access a collection of metadata items stored in database descriptor tables, wherein users can select from the metadata items to control the scope of professional development data included in two or more different reports;
   providing a computer data repository coupled to, or as part of, the computer system;
   establishing on the computer system or the computer repository, and by using the professional development definitions engine, two or more professional development data portfolios, wherein each of at least two of the professional development data portfolios is associated with a different employee of the employee-based organization;
   the computer system collecting, into at least two of the professional development data portfolios, professional development data for at least two of the employees of the organization associated with the portfolio;
   the computer system aggregating at least two of the professional development data portfolios, the aggregating including professional development data of two or more of the employees of the organization; and
   the computer system generating, for at least one aggregation of professional development data portfolios that includes professional development data for at least two employees of the organization, two or more organizational-level professional development reports, wherein each of at least one of the organizational-level professional development reports includes data for the at least two of the employees that is different than the data included in at least one other of the organizational-level professional development reports for the at least two employees.

11. The method of claim 10, further comprising:
enabling access, by a first audience, to a first one of the two or more organizational-level professional development reports; and
enabling access, by a second audience that is different from the first audience, to a second one of the organizational-level professional development reports.

12. The method of claim 10, further comprising determining a first keyword mapping for a first one of professional development reports and a second keyword mapping for a second one of the two or more professional development reports, wherein the keyboard mapping for each of the first one of the professional development reports and the second one of the professional development reports is based on items selected in a user interface by the employee.

13. The method of claim 10, further comprising determining a list of requirements for a portfolio for an employee, wherein the list of requirements is predefined for a specific vertical market.

14. The method of claim 10, wherein collecting, into at least one of the portfolios, professional development data for the employee of the organization associated with the portfolio comprises uploading to the computer system one or more documents or images evidencing professional development of the employee.

15. The method of claim 14, further comprising:
linking, by the computer system, at least one of the one or more uploaded documents or images evidencing professional development with at least one item that has been entered by the user; and
searching by keyword, on the computer system, for the at least one linked uploaded document or image.

16. The method of claim 10, wherein the two or more portfolios are established by an organization using a first computer on a network, wherein at least a portion of the professional development data for at least one of the portfolios is collected over the network from the employee associated with the portfolio, wherein the employee uses a second computer on the network to provide the collected professional development data.

17. The method of claim 16, further comprising:
electronically submitting at least one of the created portfolios for review and approval;
assigning the submitted portfolio to one or more reviewers; and
making a determination of whether the portfolio is approved.

18. The method of claim 17, wherein the at least two of the portfolios including the professional development data of two or more of the employees of the organization are aggregated after supervisory approval of the portfolios.

19. The method of claim 17, further comprising remanding at least one specific item in at least one of the portfolios to the employee associated with the at least one portfolio.

20. The method of claim 10, further comprising:
determining at least one date or event for achieving or maintaining a certification, credential, or license for one or more employees of the organization;
the computer system automatically generating at least one reminder for the determined at least one date or event; and
the computer system automatically sending the at least one reminder to the one or more employees.

21. The method of claim 10, further comprising receiving at least one keyword defined by a user and correlating the at least one user-defined keyword with specific careers, objectives, goals, licenses, certifications, credentials, training, or experience.

22. The method of claim 10, further comprising:
the computer system accessing, using the reporting engine, one or more metadata items stored in one or more database descriptor tables on the computer system; and
the computer system automatically generating, using the reporting engine, at least one report, wherein the content of the report is based at least in part on the accessed one or more metadata items.

23. The method of claim 10, further comprising customizing at least one of the interface pages that enable the users to add, view, update, and delete information to at least one portfolio.

24. The method of claim 10, further comprising limiting access based on at least one security level.

25. The method of claim 10, wherein the organization is a professional association.

26. The method of claim 10, wherein the organization is a health care provider.

27. The method of claim 10, further comprising:
electronically submitting to a third party, using the computer system, the aggregated portfolios including the professional development data of two or more of the employees of the organization.

28. The method of claim 27, wherein the electronically submitted aggregated data is part of an application for a status designation for the organization.

29. The method of claim 10, wherein the professional development definitions engine is partitioned from the professional development reporting engine.

30. The method of claim 10, further comprising displaying at least one of the organizational-level professional development reports.

31. The method of claim 30, wherein such displaying includes one or more links to one or more documents or images.

32. A computer-based, automated organizational and personal portfolio management system for aggregation, storage, and retrieval of professional development data for an employee-based health care provider, comprising:
a processor;
a computer repository coupled to the processor;
a memory configured to store program instructions executable by the processor to implement at least two professional development software engines comprising:
a professional development definitions engine configured to provide a user with a collection of one or more interface pages that enable users to add, view, update, and delete professional development data, wherein the professional development definitions engine is further configured to receive keywords defined by a user and to correlate the user-defined keywords with specific careers, objectives, goals, licenses, certifications, credentials, training, or experience; and
a professional development reporting engine configured to access a collection of metadata items stored in database descriptor tables, wherein users can select from the metadata items to control the scope of professional development data included in two or more different reports;

wherein the program instructions are further executable by the processor to implement a method comprising:

establishing on the computer system or the computer repository, and by using the professional development definitions engine, two or more professional development data portfolios, wherein each of at least two of the professional development data portfolios is associated with a different employee of the health care provider;

collecting, into at least two of the professional development data portfolios, professional development data for at least two of the employees of the health care provider associated with the portfolio, wherein collecting, into at least one of the portfolios, professional development data for the employee of the organization associated with the portfolio comprises uploading to the computer system one or more documents or images evidencing professional development of the employee;

aggregating at least two of the professional development data portfolios, the aggregating including professional development data of two or more of the employees of the health care provider; and generating, for at least one aggregation of professional development data portfolios that includes professional development data for at least two employees of the health care provider, two or more organizational-level professional development reports, wherein at least one of the organizational-level professional development reports includes data for the at least two of the employees that is different than the data included in at least one other of the organizational-level professional development reports for the at least two employees.

33. A computerized method of aggregation, storage, and retrieval of professional development data on an automated organizational and personal portfolio management system, comprising:

providing a computer system configured to implement at least two professional development software engines, wherein at least two of the professional development software engines include:

a professional development definitions engine configured to provide a user with a collection of one or more interface pages that enable users to add, view, update, and delete professional development data, wherein the professional development definitions engine is further configured to receive keywords defined by a user and to correlate the user-defined keywords with specific careers, objectives, goals, licenses, certifications, credentials, training, or experience; and a professional development reporting engine configured to access a collection of metadata items stored in database descriptor tables, wherein users can select from the metadata items to control the scope of professional development data included in two or more different reports;

providing a computer data repository coupled to, or as part of, the computer system;

establishing on the computer system or the computer repository, and by using the professional development definitions engine, two or more professional development data portfolios, wherein each of at least two of the professional development data portfolios is associated with a different employee of the health care provider;

the computer system collecting, into at least two of the professional development data portfolios, professional development data for at least two of the employees of the health care provider associated with the portfolio, wherein collecting, into at least one of the portfolios, professional development data for the employee of the organization associated with the portfolio comprises uploading to the computer system one or more documents or images evidencing professional development of the employee;

the computer system aggregating at least two of the professional development data portfolios, the aggregating including professional development data of two or more of the employees of the health care provider; and the computer system generating, for at least one aggregation of professional development data portfolios that includes professional development data for at least two employees of the health care provider, two or more organizational-level professional development reports, wherein at least one of the organizational-level professional development reports includes data for the at least two of the employees that is different than the data included in at least one other of the organizational-level professional development reports for the at least two employees.

34. A computer-based, automated organizational and personal portfolio management system for aggregation, storage, and retrieval of professional development data, comprising:

a processor;

a computer repository coupled to the processor;

a memory configured to store program instructions executable by the processor to implement at least two professional development software engines comprising:

a professional development definitions engine configured to provide a user with a collection of one or more interface pages that enable users to add, view, update, and delete professional development data, wherein the professional development definitions engine is further configured to receive keywords defined by a user and to correlate the user-defined keywords with specific careers, objectives, goals, licenses, certifications, credentials, training, or experience; and a professional development reporting engine configured to access a collection of metadata items stored in database descriptor tables, wherein users can select from the metadata items to control the scope of professional development data included in two or more different reports;

wherein the program instructions are further executable by the processor to implement a method comprising:

establishing on the computer system or the computer repository, and by using the professional development definitions engine, one or more personal professional development data portfolios associated with an individual; and collecting, into at least one of the personal professional development data portfolios, professional development data for the individual associated with the portfolio, wherein collecting, into at least one of the personal professional development data portfolios, personal professional development data for the individual associated with the portfolio comprises uploading to the computer system one or more documents or images evidencing professional development of the individual.

35. The system of claim 34, wherein the program instructions are further executable by the processor to implement:
creating two or more versions of at least one of the personal professional development data portfolios, wherein each of the versions comprises different information about the individual.

36. The system of claim 35, wherein each of at least two of the versions is for a different audience, wherein the program instructions are further executable by the processor to implement:
enabling access to at least one of the versions by at least one audience.

37. The system of claim 34, wherein the system is further configured to generate reminders to at least one of the individuals of key dates and events associated with the careers, objectives, goals, licenses, certifications, credentials, training, or experience.

38. The system of claim 34, wherein the program instructions are further executable by the processor to implement:
associating one or more credentials or privileges with a task to be performed by an employee-based organization;
automatically matching the one or more credentials or privileges with at least one of the portfolios; and
scheduling the task to be performed based on the matched at least one portfolio that matched the one or more credentials or privileges.

39. The system of claim 34, wherein the program instructions are further executable by the processor to implement displaying at least a portion of at least one of the personal professional development data portfolios.

40. The system of claim 39, wherein such displaying includes one or more links to at least one of the one or more documents or images.

41. A computerized method of aggregation, storage, and retrieval of professional development data on an automated organizational and personal portfolio management system, comprising:
providing a computer system configured to implement at least two professional development software engines, wherein at least two of the professional development software engines include:
a professional development definitions engine configured to provide a user with a collection of one or more interface pages that enable users to add, view, update, and delete professional development data, wherein the professional development definitions engine is further configured to receive keywords defined by a user and to correlate the user-defined keywords with specific careers, objectives, goals, licenses, certifications, credentials, training, or experience; and
a professional development reporting engine configured to access a collection of metadata items stored in database descriptor tables, wherein users can select from the metadata items to control the scope of professional development data included in two or more different reports;
providing a computer data repository coupled to, or as part of, the computer system;
establishing on the computer system or the computer repository, and by using the professional development definitions engine, one or more personal professional development data portfolios associated with an individual; and
collecting, into at least one of the personal professional development data portfolios, professional development data for the individual associated with the portfolio, wherein collecting, into at least one of the personal professional development data portfolios, personal professional development data for the individual associated with the portfolio comprises uploading to the computer system one or more documents or images evidencing professional development of the individual.

42. The method of claim 41, further comprising:
creating two or more versions of at least one of the personal professional development data portfolios, wherein each of the versions comprises different information about the individual; and
enabling access to at least one of the versions by at least one audience.

43. The method of claim 41, further comprising generating at least one reminder to at least one of the individuals of key dates and events associated with the careers, objectives, goals, licenses, certifications, credentials, training, or experience.

44. The method of claim 41, wherein collecting, into at least one of the portfolios, professional development data for the employee of the organization associated with the portfolio comprises uploading to the computer system one or more documents or images evidencing professional development of the employee.

45. The method of claim 44, further comprising:
linking, by the computer system, at least one of the one or more uploaded documents or images evidencing professional development with at least one item that has been entered by the user; and
searching by keyword, on the computer system, for the at least one linked uploaded document or image.

46. The method of claim 41, further comprising displaying at least a portion of at least one of the personal professional development data portfolios.

47. The method of claim 46, wherein such displaying includes one or more links to at least one of the one or more documents or images.

* * * * *